United States Patent
Johnson et al.

(10) Patent No.: US 6,567,805 B1
(45) Date of Patent: May 20, 2003

(54) INTERACTIVE AUTOMATED RESPONSE SYSTEM

(75) Inventors: David E. Johnson, Cortlandt Manor, NY (US); Frank J. Oles, Peekskill, NY (US); Thilo W. Goetz, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/570,788

(22) Filed: May 15, 2000

(51) Int. Cl.[7] ............................................. G06F 17/30
(52) U.S. Cl. .................. 707/5; 707/4; 707/3; 704/9
(58) Field of Search ...................... 707/5, 4, 3; 704/9

(56) References Cited

U.S. PATENT DOCUMENTS

| | | | | |
|---|---|---|---|---|
| 5,748,974 A | * | 5/1998 | Johnson .......................... | 704/9 |
| 5,924,090 A | | 7/1999 | Krellenstein ................... | 707/5 |
| 5,974,409 A | * | 10/1999 | Sanu et al. ..................... | 707/3 |
| 6,223,145 B1 | * | 4/2001 | Hearst ........................... | 703/22 |
| 6,377,913 B1 | * | 4/2002 | Coffman et al. ................ | 704/8 |
| 6,377,944 B1 | * | 4/2002 | Busey et al. ................... | 707/3 |

* cited by examiner

*Primary Examiner*—Greta Robinson
(74) *Attorney, Agent, or Firm*—McGuireWoods LLP; Stephen C. Kaufman (57) ABSTRACT

A computerized system responds, not just to a single query issued by a user, but to a query in the context of a dialog with the user. The system, which is referred to as an interactive automated response system, consists of three principal components or subsystems, which are a text categorizer that assigns categories to text extracted from a dialog, a search system whose purpose is to match text extracted from a dialog with answers, and a dialog manager whose purpose is to maintain a user's session history, to decide what text should be sent to the text categorizer and to the search system, to make use of a partially ordered category scheme to categorize each stage of the dialog based on the results returned by the other components, and to use the results of dialog categorization, as well as the results returned by the other components to create suitable responses to the user's query in the context of his or her earlier queries.

19 Claims, 4 Drawing Sheets

INTERACTIVE AUTOMATED RESPONSE SYSTEM

BACKGROUND OF THE INVENTION

1. Field of the Invention

The present invention relates to a method for answering accurately and automatically queries submitted for the purposes of exploring and extracting information from an online knowledge source, such as an enterprise website, an online catalogue, a database, or a computer-based help system.

2. Background Description

It is certainly desirable to have a computer system that can respond to a user's requests for information, where those requests may be formulated using either full sentences or simply as phrases suggesting the user's interests, in addition to the usual means of eliciting feedback such as clicking on links, selecting from lists, sending keywords to search engines, etc. However, frequently users wishing to obtain information from an online knowledge source either 1. have more than one question they want answered and those questions are related to one another, or,
2. as they make inquiries, related questions come to mind.

Hence, one would like an effective system for answering questions that intelligently takes into account the context provided by earlier questions and the responses to them that have been provided.

SUMMARY OF THE INVENTION

It is therefore an object of the present invention to provide an interactive automated response system.

The invention is a computerized system that can respond, not just to a single query issued by a user, but instead to a query in the context of a dialog with the user. Such a system, which we term an interactive automated response system, consists of three principal components or subsystems:

1. a text categorizer whose purpose is to assign categories to text extracted from a dialog,
2. a search system whose purpose is to match text extracted from a dialog with answers, and
3. a dialog manager whose purpose is
   (a) to maintain a user's session history,
   (b) to decide what text should be sent to the text categorizer and to the search system,
   (c) to make use of a partially ordered category scheme to categorize each stage of the dialog based on the results returned by the other components, and
   (d) to use the results of dialog categorization, as well as the results returned by the other components to create suitable responses to the user's query in the context of his or her earlier queries.

Before going further, we would like to clarify our use of terminology:

1. By a query we mean both the contents of a communication sent by a user to an interactive automated response system and, within the interactive automated response system, data sent by the dialog manager to the search system to be used in finding a matching answer. The context will always make clear which meaning is intended.
2. By a response we mean the contents of a communication sent by an interactive automated response system to a user in order to satisfy a query from the user. The response may include the best answer found by the search system (according to the scores of the matching answers) as well as a list of relevant categories (ranked by confidence level) found by the text categorizer from which a subsequent selection may be made by the user if the displayed response does not fully meet the user's needs.
3. By an answer we mean data found by a search system that matches a query sent to it by a dialog manager. A set of answers, if any matches are found, can be used by the dialog manager, in determining the best response to a query from the user.
4. By a category we mean a class of answers. Each answer normally belongs to one or more categories. A text categorizer assigns categories to text extracted from a dialog in order to determine the current subjects of the dialog. So, while a category normally is used to describe a class of possible answers, a category can also be viewed as a description of a current subject of the user's query. We refer to the set of categories as the category scheme, and its exact nature will depend on the answers available from the online knowledge source and the kinds of inquiries anticipated.

Thus, an interactive automated response system requires the following data as part of its set-up to be fully functional:

1. a category scheme,
2. data to be used by the text categorizer (e.g., a rule file for a text categorizer that works by applying symbolic rules),
3. data to be used by search engine for finding matches to queries, such as an index of which keywords are relevant to which answers, as well as a description of which answers belong to which categories,
4. data in the form of actual answers or pointers, such as Universal Resource Locators (URLs), specifying where actual answers may be found, to be used by the dialog manager to create responses.

This data may be stored in various eXtended Markup Language (XML) files, as just one possibility.

Part of this invention is the use of a category scheme that is endowed with a partial order. We call the partial ordering subsumption. Thus, for categories X and Y, when we write $X \leq Y$, we mean X is subsumed by Y, or, in other words, X is a more specific category than Y. The idea of a partial order is quite general and includes as a special case a hierarchy of categories given by a tree. Since the partial order can be used to determine which of two categories may be more specific than the other, using a partially ordered set of categories enables the system to simplify the set of categories assigned to a stage of a dialog by discarding all but the most specific categories. This is important if the system is to come up with a response that is both specific and appropriate to the query. Creating data structures, accessible by the dialog manager, that define both the category scheme and the partial order on the category scheme is an integral part of setting up the system.

The intended mode of operation of an interactive automated response system is as follows. At each stage of the dialog, i.e., after each user input is received, the dialog manager extracts one or more texts from its record of dialog, sends those texts to the text categorizer and then uses the results of categorizing the texts to assign one or more categories to the latest stage of the dialog. There are two uses made of the categories found at this point:

1. One use of the categories found at this point is to narrow provisionally the set of possible answers deemed relevant to the user's latest query.

2. Another use of the categories found is to determine what text is to be sent by the dialog manager to the search system. By comparing the currently assigned categories with those previously assigned, one can detect whether the user is drilling down (asking about a more specific subject) or switching topics. If the user is drilling down, then one way to search for an answer in context would be to base the search on a combination of the current query with an earlier query or queries. If the user is switching topics, then the current query, in isolation from the earlier queries, should be used as the basis for the search for answers.

At any rate, the dialog manager sends queries in the form of texts that are deemed to be the best evidence for the category assignments so far made to the search system. For each query sent to the search system, the search system returns any matches (answers or answer IDs) together with the categories to which each matching answer belongs, as well as, for each match, a score indicating the relative degree of fit of the match to the query. The final categories assigned to a stage of a dialog may depend, not only on the categories found by text categorization, but also on the categories of answers found by the search system. The assignment of categories to a stage of a dialog, in the context of the entire dialog up to that point, is what we term dialog categorization. We address in more detail below how dialog categorization differs from the related problems of text categorization and topic detection in text. The details of dialog categorization will also be discussed in detail. Finally, based on the categories assigned and the answers found, a response is sent by the dialog manager to the user, which can involve several components, such as 1. a display of the answer deemed best, which may be a web page (displayed in a browser or otherwise), a video clip, audio, images, a text file, etc.
2. a listing of links to answers deemed related to the query from which the user can choose for display purposes,
3. a list of categories of answers deemed related to the query from which the user can choose to display subcategories and/or links to specific answers associated with a listed category,
4. an offer to the user of a chance to add more text, thereby refining his query or switching to a new topic,
5. an offer to the user of a chance to revisit an earlier stage of the dialog,
6. an offer to the user of help on how to use the system, and/or item an offer to the user of a chance to start a new session.

Because the dialog at any stage may be assigned multiple categories, there is a certain amount of complication that must be sorted through in order to implement the mode of operation described above. To handle the various complications, one capability that we deem essential for the dialog manager is the maintenance of a user's session history, by which we mean a history of the user's current dialog with the system. The session history should contain 1. each previous user input, which may be either a natural language query or a user-made choice elicited by an earlier response sent by the system to the user,
2. for each previous user input, the set of categories assigned to that input,
3. for each previous user input and for each category assigned that user input, the textual evidence for that categorization assignment, and
4. for each previous user input, the set of answers or answer IDs used in determining the response sent to the user.

The text categorizer used by an interactive automated response system may be any system that assigns categories to data containing text, such as one that applies symbolic rules, one that uses decision trees, one that uses a linear separator, a Bayesian classifier, etc. The text categorizer may be developed using machine learning techniques, applied to training data, or it may be constructed by hand. The principle requirement is that the text categorizer be able reliably and efficiently to assign predetermined categories to data objects consisting of text. In the preferred embodiment, the text categorizer should also return a confidence level with each category assigned to text data submitted to the text categorizer, where the confidence level is a quantitative estimate of the degree of confidence in or the degree of utility of the assignment. The confidence level can be used by the dialog manager to plan the layout of the eventual response to the user, with more prominence given to parts of the response related to categories, with higher confidence levels. The search system used by an interactive automated response system may be any system that matches text to answers, returning either actual answers or answer IDs. The answers themselves might be text, web pages, video clips, audio files, etc. One component of the search system needs to be a file or database containing information about answers that could be used in composing responses to users. The information stored corresponding to a particular answer includes a representation of that answer as a list of keywords or features, the presence of which in a query would be regarded as partial evidence that the answer matched the query. The information stored corresponding to a particular answer also includes a description of the set of categories to which that answer belonged. Normally, the search system would be a document matching system in which the text supplied to the search system would be treated as a queries that would be compared with keywords extracted from answers and/or from data related to the answers, such as example questions having a particular answer. For each text submitted to the search system, those answers that matched would be returned, and with each matching answer the categories to which that answer belonged would be returned, as well as a score indicating the closeness of the match.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
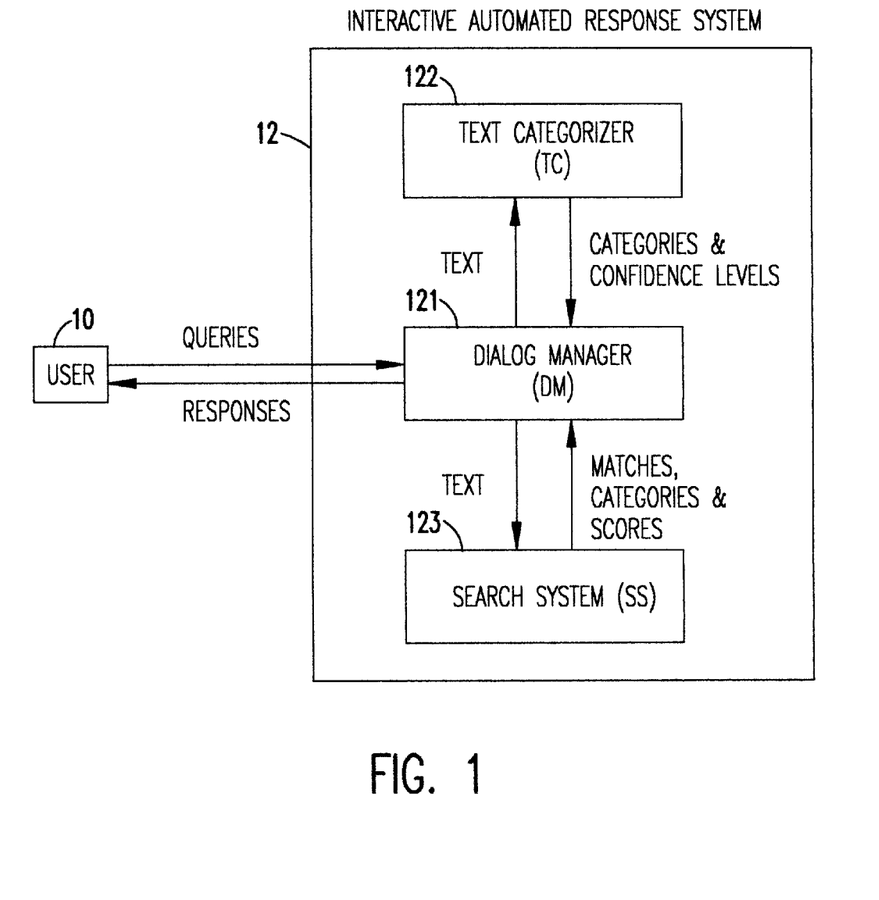
FIG. 1 is a block diagram showing the major components of an interactive automated response system, as well as the kinds of information that flows between the various components.

Referring now to the drawings, and more particularly to FIG. 1, there is shown a functional block diagram of the present invention. A user 10 inputs queries to the interactive automated response system 12 of the invention which, in turn, provides responses to the user. The series of queries from the user 10 and the responses from the interactive automated response system 12 constitute a session dialog. The interactive automated response system 12 comprises a dialog manager (DM) 121 which receives the queries from the user and provides the responses to the user. The queries may be typed, written or spoken and are input by the user in a natural language format. If the queries are written or spoken, the dialog manager 121 includes appropriate hand writing and/or voice recognition modules to generate a textual input for analysis. The responses may be displayed text and/or synthesized voice response hand writing and voice recognition technology and voice synthesis technology are well known in the art and do not require further description for understanding by those skilled in the art.

The interactive automated response system 12 further includes a text categorizer (TC) 122 and a search system (SS) 123. When a query is received from the user, the dialog manager 121 parses the input text to determine the text to be input to the text categorizer 122. The text categorizer 122 analyzes the input text and provides outputs of categories and confidence levels to the dialog manager 121. The dialog manager 121 determines what text items should be input to the search system 123. The search system 123 responds with matches, categories and scores. The dialog manager 121 includes storage which stores the user's session history. Based on the inputs from the text categorizer 122 and search system 123 and the user's session history, the dialog manager 121 generates appropriate responses to the user queries.

Figure 2:
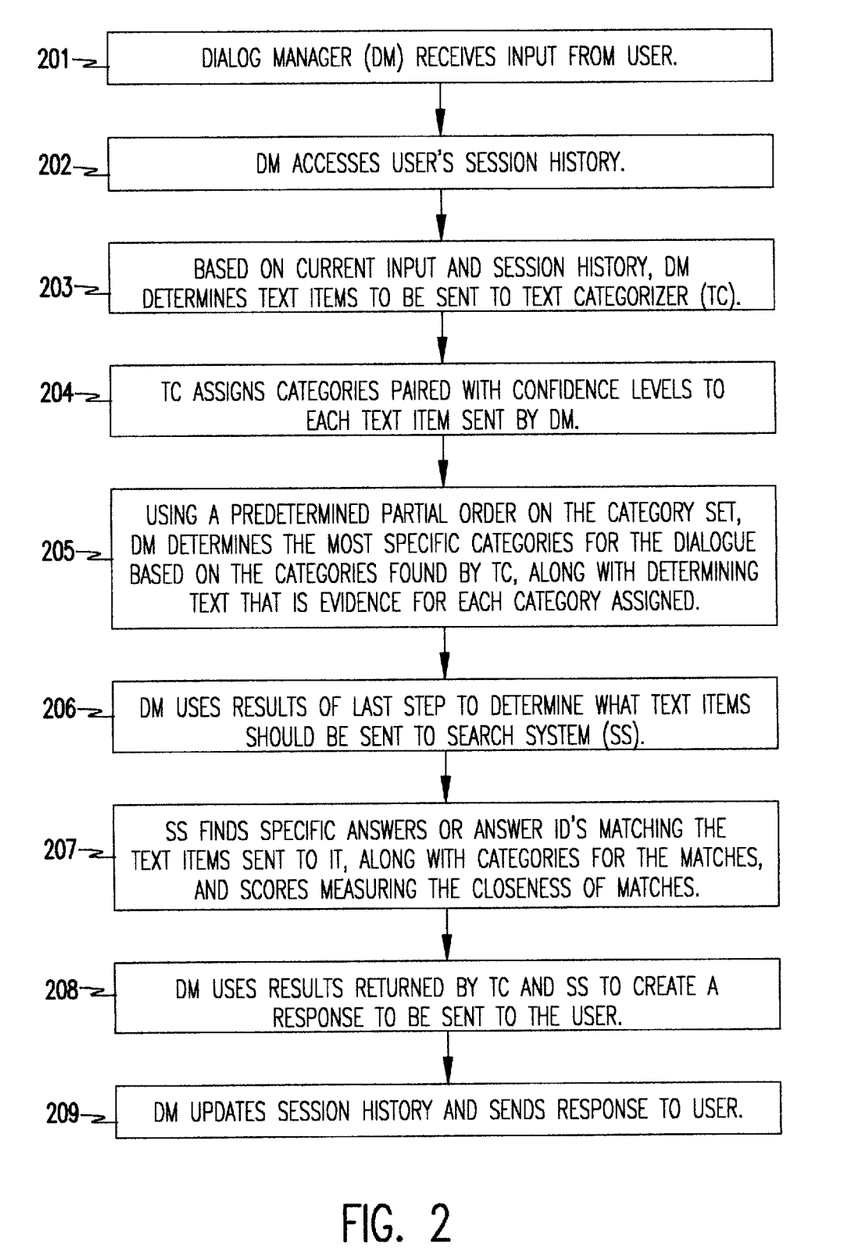
FIG. 2 is a flow diagram showing the overall logic of an interactive automated response system.

Referring now to FIG. 2 with continued reference to FIG. 1, the operation of the dialog manager 121 will be described in more detail. The process begins when the dialog manager 121 receives an input from the user in function block 201. The dialog manager 121 accesses the user's session history in function block 202 and, based on the user's current input and the session history, the dialog manager determines the text items to be sent to the text categorizer 122 in function block 203. The text categorizer 122 assigns categories paired with confidence levels to each text item sent by the dialog manager in function block 204 and returns this information to the dialog manager. Using a predetermined partial order on the category set returned by the text categorizer 122, the dialog manager 121 determines the most specific categories for the dialog based on the categories found by the text categorizer, along with determining text that is evidence fore each category assigned in function block 205. The dialog manager 121 then uses the results of the last step to determine what text items should be sent to the search system 123 in function block 206. The search system 123 finds specific answers or answer IDs matching the text items sent to it by the dialog manager 121, along with categories for the matches and scores measuring the closeness of matches in function block 207. The dialog manager 121 then uses the results returned to it by the text categorizer 122 and the search system 123 to create a response to be sent to the user in function block 208. Finally, the dialog manager updates the session history and sends a response to the user in function block 209.

Figure 3:
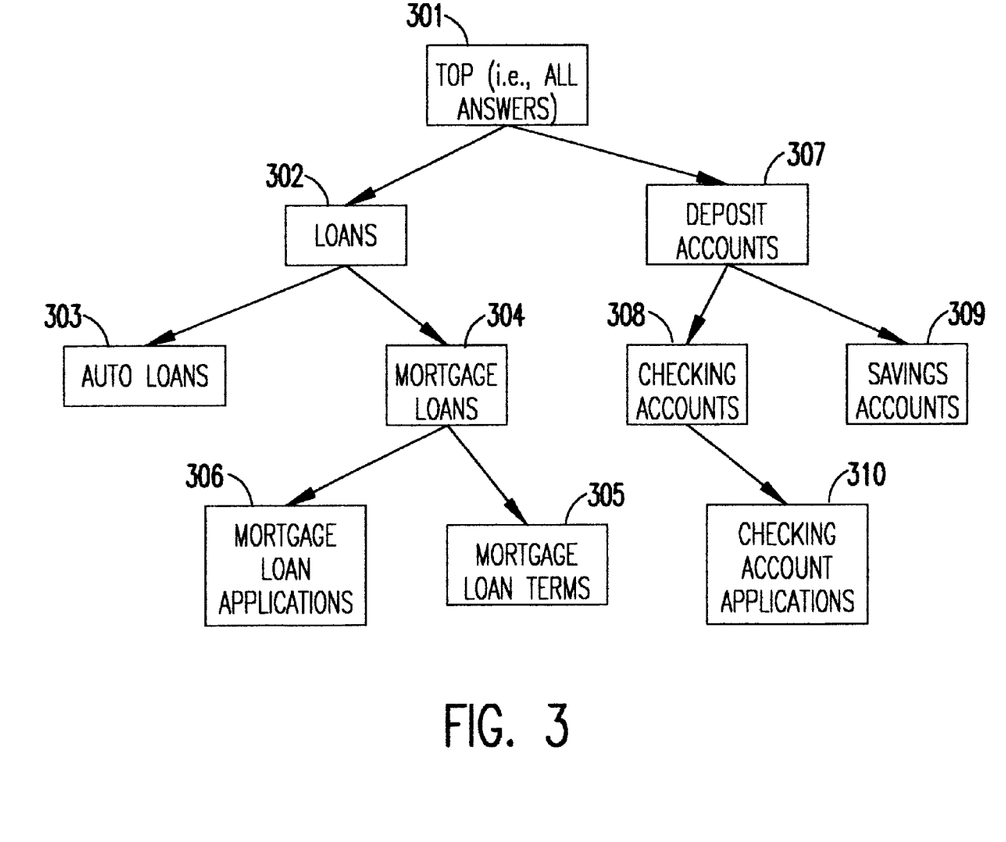
FIG. 3 depicts a simple category scheme that can be represented as a tree, in which the most specific categories are those farthest from the root of the tree.

FIG. 3 shows a sample category scheme in the form of a tree. The example illustrated assumes that the system is installed in a financial institution, such as a bank, to respond to queries input by customers or potential customers. More specific categories are farther down the tree. Thus, mortgage loan terms 305 is more specific than mortgage loans 304, which in turn is more specific than loans 302. At the top of the hierarchy is a category 301 encompassing all answers supported by the system. Among the answers in the category-mortgage loan terms 305 might be (1) a Web page describing adjustable rate mortgages and (2) another Web page describing fixed rate mortgages. Among the answers in the category checking account applications 310 might be a Web page through which a user could initiate online a checking account application. In this interactive automated response system, we assume that there are specific Web pages providing answers for all of the most specific nodes (the leaves of the tree) in FIG. 3, and these answers can be found by the search system on the basis of the occurrence of specific words in queries submitted to the search system.

Let us walk through a typical exchange between a user and this particular example of the interactive automated response system. This exchange is one of many that are possible and is provided here for illustrative purposes only. The user starts by visiting the bank's home page He or she inputs the following request:

"Please tell me about loans."

This request might be spoken or input via a keyboard. We will assume keyboard entry for this example. In this case, the user has employed a natural language query that is well formed, including the correctness of the punctuation and capitalization, but this is not essential to the practice of the invention. The dialog manager 121 (FIG. 1) would send the text of the initial query to the text categorizer 122, where it would be classified in the general category "loans" 302. The text would also be sent to the search system 123 where no matches with high enough scores to be considered would be found due to the generality of the query. The system responds by asking the user what kind of loan he or she is interested in, possibly by displaying a list of the sub-categories of the category "loans" 302 which, in this illustrative example, includes "auto loans" 303 and "mortgage loans" 304. The user in our example responds by saying he or she is interested in mortgage loans, which he or she might do by clicking on a selection in the list, but for our example, let us assume that he or she enters the text:

"mortgage"

which is just a word, and not a complete well-formed sentence. We assume in this example that the word "mortgage" by itself is not sufficient to trigger a rule for the category "mortgage loans" 304. But, we also assume that the text "mortgage" in combination with the prior text "Please tell me about loans" is sufficient to trigger such a rule, so that the system assigns the category "mortgage loans" 304 to this stage of the dialog. The interactive automated response system then responds to the user by asking for more particulars. The system could do this by making available for selecting the categories of "mortgage loan applications" 306 and "mortgage loan terms" 305. At this point the user does hot make a selection but instead types in "application".

The system interprets this input in the context of the dialog, categorizing the current state of the dialog as "mortgage loan applications" 306 and displays the matching answer found by the search engine 123 (FIG. 1) enabling the user, if he or she desires, to apply, for a mortgage online. The evidence recorded by the system as evidence for this answer is the concatenation of "application", "mortgage", and "Please tell me about loans". Even if there were a rule used by the text categorizer 122 stating that an occurrence of the word "application" may be indicative of the category "checking account application" 308, the "checking account application" category 308 was not assigned to the dialog at this point because this interactive automated response system prefers to find drill-down as opposed to topic switch. (The terms drill-down and topic switch are discussed in more detail below.) Continuing this dialog after examining the application, the user may well decide to examine "mortgage loan terms" 305 by entering "What are the terms for an adjustable rate mortgage?" The presence of the words "terms" and "mortgage" in the latest query would lead the text categorizer 122 to assign a new category to the dialog, "mortgage rate terms" 305, one that is not a refinement of "mortgage loan applications" 306. This is an instance of a topic switch. With this realization, only that part of the dialog sufficient to validate the conclusion that the subject is mortgage loan applications 306 would be marked as being relevant to later categorization decisions. Hence, the evidence for this category assignment is taken to be only the words "What are the terms for an adjustable rate mortgage?" This means the system stops using the earlier portion of the dialog to determine the response and only uses the most recent input from the user. At this stage, the search system finds an answer—the Web page dealing with the terms for adjustable rate mortgages— to display to the user. After reading the terms, the user becomes aware that the bank gives better mortgage rates to holders of deposit accounts. If the user then inputs "savings accounts",
there would be another topic switch, and the interactive automated response system would display the best matching answer in the category "savings accounts" 309, which we assume is a Web page giving general information on savings accounts. At this point, the user terminates the dialog, possibly because of an interruption or possibly because he or she wishes to visit a different Web site or for whatever reason.

In the next section we will discuss approaches to the implementation of the component of an interactive automated response system. We will also elaborate on procedures for, as well as give a conceptual analysis of, dialog categorization.

Implementing the Components

Figure 4:
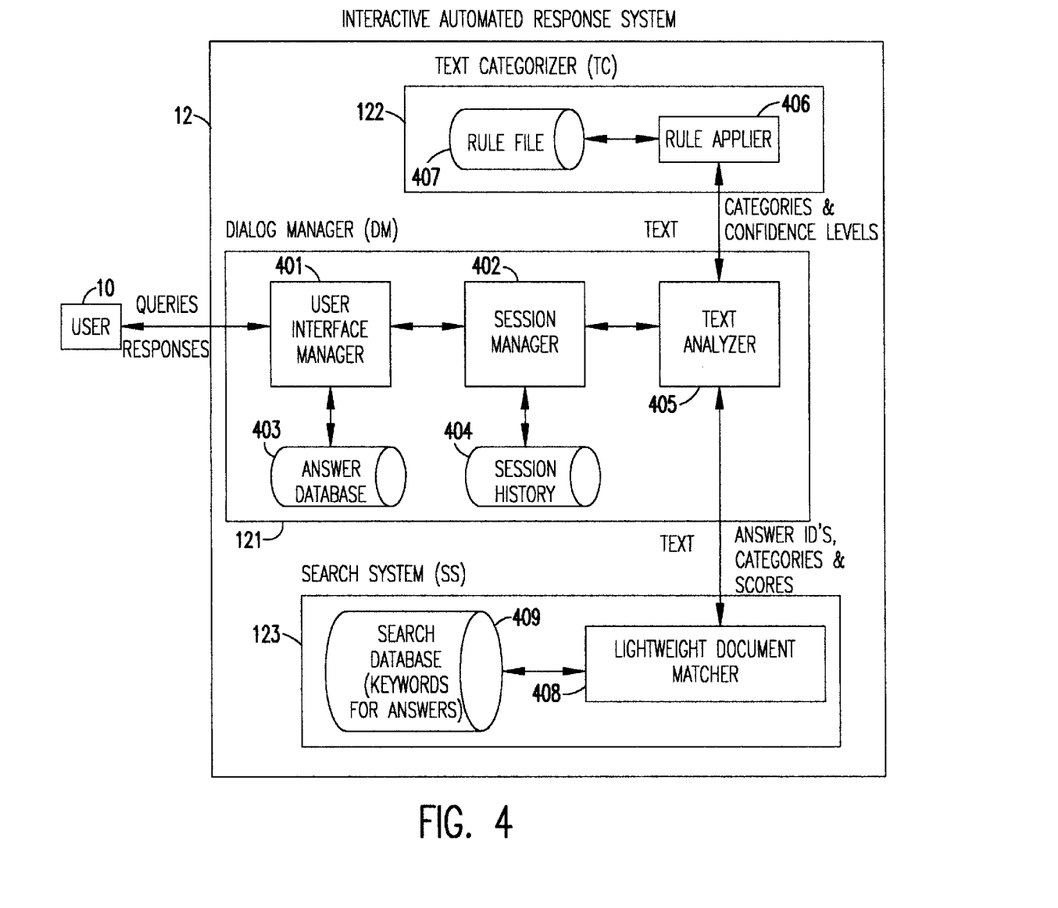
FIG. 4 shows details of a preferred embodiment of this invention, in which possible internal components of the dialog manager, the text categorizer, and the search system are laid out.

Referring to FIG. 4, the internal components of a preferred embodiment of this invention are shown. As is indicated in FIG. 4, the dialog manager 121 may be further decomposed into three modules:

1. The user interface manager 401 has the task of communicating with the user. The user interface manager 401 performs the initial processing of input from the user and passes the results to a session manager 402. The user interface manager also formulates responses to the user on the basis of categories, answer IDs, confidence levels, and scores relayed to it by the session manager. When answer IDs are relayed to the user interface manager, the actual corresponding answers can be found in the answer database 403 accessed by the user interface manager 401.
2. The session manager 402 has the job of maintaining the session history maintained in a session history database 404. The session manager 402 also mediates between the user interface manager 401 and the text analyzer 122, passing user queries from the user interface manager 401 to the text analyzer 122 and passing the text analyzer's results to the user interface manager 401. The session manager 402 stores the user queries in the session history database 404, as well as storing in the session history with each user query the information found by the text analyzer, including categories, answer IDs, confidence levels, scores, and, very importantly, indication of which parts of the dialog are deemed the evidence for the category and answer recommendations of the text analyzer.
3. The text analyzer 405 processes text sent to it by the session manager 402, which involves tokenization, stemming, and identifying all features of the text— including occurrences of keywords—that are of use to the text categorizer 122 and the search system 123. The text analyzer 405 also carries out dialog categorization based on the results returned by the text categorizer 122 and the search system 123. Finally, the text analyzer 405 passes the results of its analysis to the session manager 402. As noted above, The results passed by the text analyzer 405 to the session manager 402 include categories, answer IDs, confidence levels, scores, and, indication of which parts of the dialog are deemed the evidence for the category and answer recommendations of the text analyzer.

As indicated in FIG. 4, a preferred implementation of the text categorizer 122 of the interactive automated response system is to use symbolic rules for categorization. This requires a rule applier module 406 that applies rules, found in a rule file 407, to text passed to the rule applier by the dialog manager 121. The rule file could be generated either by hand or by symbolic rule induction, if suitable training data were available. Even if the rules were machine generated, an advantage of symbolic rules is that they can be understood, and consequently can be edited, by a human being in order to improve the overall performance of the system. In a preferred implementation, each rule in the rule file will be a conjunction of conditions involving the presence or absence of features in the text, yielding, when all conditions axe satisfied, a category to be assigned to the text. Furthermore, each rule will have attached to it a confidence level reflecting the reliability or utility of the category assignment made when the rule fires. Categories found, and confidence levels, are passed to the dialog manager 121 by the rule applier 406.

A preferred implementation of the search system 123 of the interactive automated response system is via a lightweight document matcher 408 that can efficiently match text sent to it with keywords corresponding to answers. Each set of keywords, along with an answer ID and, the set of categories to which the corresponding answer belongs, is stored in a search database 409. The keyword sets may be constructed by hand or automatically from sets of sample questions for each answer. Whenever a match is found and deemed significant, the lightweight document matcher 408 returns the answer ID, the corresponding categories, and a score measuring the closeness of fit of the query to the matching keywords.

Dialog Categorization

We now describe how to assign categories after receiving queries during a dialog between a user and the interactive automated response system that employs a conversational interface to explore and to provide information from a knowledge source, such an enterprise website, a catalogue, or a database. Then, in this context, by a dialog we mean a sequence of queries from a user, interspersed with system-generated responses. The responses may 1. provide a specific answer, or
2. ask the user to make a choice, or
3. solicit additional natural language input about the user's purpose, or
4. do a combination of the above.

When the user makes a choice, there is a well-defined narrowing of the topics under consideration. However, when the user enters additional text, without some kind of analysis it is unclear whether that new text serves to narrow the line of inquiry, or to change it radically, or even to do both (due to the expressive potential of language). Moreover, only parts of the session history may be relevant to the current focus of the dialog.

Therefore, after each query containing text is received, some text must be extracted from the dialog and the dialog must be categorized on the basis of what is extracted. Recognizing that the problem of how to do this needs a brief technical name, we will refer to this activity as dialog Categorization. Dialog categorization is here viewed as an adjunct to the process of finding answers to queries.

Requirements for Dialog Categorization

The foremost goal of dialog categorization is to narrow the range of responses deemed valid for a user's query, with the practical benefit of narrowing the space in which to look for relevant answers for a user's query. But often there will be no specific answers to be retrieved early on in the dialog, or there will be no specific answers to be found immediately after what a human being would recognize as a topic switch. So, dialog categorization plays a major role in choosing the specific character of the response. When the decision is made to ask the user to make a choice, the range of choices provided by the system is driven by dialog categorization.

Note that dialog categorization involves repeatedly revisiting categorization decisions during a user session. Categorizing the dialog at all stages is important, even after queries that lead to specific answers, because subsequent queries, if any, need a context in which to do subsequent categorization.

The dynamic problem of categorizing a dialog is more complex than the static problem of simply categorizing text. Aside from the obvious difference that dialog categorization is not a one-shot affair, complexity arises because, in dialog categorization, it is not clear exactly what text drawn from the dialog should enter into a categorization decision. Dialog categorization is reminiscent of the problem of topic detection in text, in that differing parts of a dialog can be assigned different topics. But, topic detection is different from dialog categorization because 1. segmentation of the text to find the boundaries that separate different topics can be simplified in dialog categorization (since, for the purpose of dialog categorization, the only boundaries of interest can be taken to be the ends of individual queries), and
2. topic detection is focused on pure categorization, as opposed to categorization as an adjunct to finding answers to queries.

In the preferred embodiment of the invention, the primary text categorization tool, i.e., the text categorizer 122 is rule-based, but the exact nature of the text categorizer is really quite immaterial to giving a general solution to the dialog categorization.

Normally, we seek to use the search system 123 of the interactive automated response system to obtain responses to constrained queries. A constrained query is a query sent to the search system that comes with an assigned category whose purpose is to focus the search system's search space. When we issue a constrained query, only answers consistent with the constraining category are considered. A constrained answer is an answer found for a constrained query. In contrast, an unconstrained query is a'search request based on a query alone without a constraining category, so that the entire database is searched. An unconstrained answer is an answer found to an unconstrained query.

If one seeks to build a robust interactive automated response system, then an unconstrained search for answers should be called into play whenever the system seems to be failing to make progress in finding answers by using the primary approach to categorization. Here is a place where the view of dialog categorization as an adjunct to finding answers to queries can make itself felt in a specific way: the search system itself can work as an auxiliary categorizer, in that the results returned by search will fall typically into particular categories, and those categories can be used in categorizing the current state of the dialog. An approach that cleanly integrates the use of both a primary text categorization tool and a secondary search-system-based categorizer is then clearly, needed.

Thus, a dialog categorization solution should have the following features and components:

1. a primary categorization system based on categorizing text,
2. a history of dialog categorization decisions, each decision being associated with the point in the dialog to which it refers,
3. a record of the evidence or reason for each categorization decision,
4. a technique for using the last set of dialog categorization decisions in determining the current set of decisions,
5. a technique for relating the evidence for last set of dialog categorization decisions to determining the evidence for the current set of decisions,
6. a criterion governing when to use constrained search for an answer and when to use unconstrained search, and
7. a description of how to combine and balance the categories found by the primary text categorization tool with those found by unconstrained search using the search system.

As we lay out the details, we will be sensitive to the following issues and pragmatic observations:

1. The dialog may possibly be categorized with multiple categories.
2. The user's most recent input is the most important.
3. The user has probably been asking about the same category since the last topic switch.
4. If the user chooses a category, (for example, by clicking on a selection in a displayed list), this choice should restrict the next category assigned to the dialog.
5. Responses should not be repetitive.

The last point in the preceding list has an implication. The dialog manager of an interactive response system should maintain in memory those answers (or answer IDs) recently found in the course of carrying on a dialog. The list of recently found answers can then have a role to play in determining when the system should fall back onto unconstrained search.

We will next give a somewhat mathematical analysis of the problem of dialog categorization, resulting in an approach that takes into account all the significant issues and that works well in practice.

A Framework for Categorizing Dialogs

If we assume the collection of categories has a hierarchical structure, then the hierarchy can be employed in the design of a system that aims whenever possible to provide the most specific answers that appear to be desired by a user. Thus, we assume the collection of all categories forms a set partially ordered by a relation called subsumption. We write $X \leq Y$ when category X is subsumed by category Y. So, if $X \leq Y$, then X is more specific than Y. When, as is the case in our system, the category hierarchy is given by a tree (where paths run away from the root), then $X \leq Y$ means that there is a path from the Y to X (and, in particular, Y is closer to the root than X). As a mathematical convenience, we assume that the poset of categories has a unique maximal element T, pronounced "top". The category T is the least specific category possible, and, as such, specifies no information about the user's subject or goal in conducting a dialog. The category T need not be represented explicitly in an actual implementation, although it might be. If the category hierarchy is a tree, then T is the root of the tree.

We can now use the subsumption ordering to make precise the intuitive idea that we want our categorization decisions to be tightly focused on satisfying the user as quickly as possible. To this end, any set of categories that we assign to a dialog will consists of only "most specific categories" (i.e., only the most specific candidates found for assignment to the dialog). So, in the parlance of order theory, each set of categories assigned to a dialog at a point in time be will an antichain, which is a subset of a poset in which no two different elements are comparable.

Along with assigning a set of categories to a dialog at a point in time, we will also determine that portion of the dialog relevant to that categorization decision. We will assume that once a past user query turns out to be no longer relevant to a categorization decision, then it need not be taken into account in future decisions. While one may quibble with this strategy if one insists on leaving no possibility unexamined, we believe it is effective for most dialogs aimed at extracting information from sources where we would anticipate deployment of an interactive response system. This strategy obviously lessens the computational load in practice in comparison with a more exhaustive consideration of possibilities.

Again for the purposes of efficiency and simplicity, for each category C assigned to a dialog, we will assume that there is a single previous text p, extracted from the part of the dialog entered by the user, that is the best identifiable textual evidence for the presence of the category C in the last categorization decision.

We shall also assume that the best textual evidence p for C will always include all text extracted from the user's input onwards from some point in time and include the last text extracted before the relevant dialog categorization decision. This reflects another practical simplification: we only want to consider sequences of queries that do not skip any queries as being relevant to determining the categorization at any point in time.

The criterion for the best evidence is intentionally slightly vague. At the general level, our inclination is to take best evidence to mean the minimal evidence that is sufficient. This will be the meaning we will use as we lay out our general approach in this section. However, the meaning of "best evidence" will change in a later section is where the "rubber meets the road" and we discuss how to modify the general approach to speed up processing while still doing a good job at dialog categorization.

Building a practical system that simultaneously handles dialogs with large numbers of concurrent users will be much more easily attainable with the preceding assumptions. Although we may at times be led slightly astray, how far astray we may go will only be assessable with experience. Our pragmatic aim is to be right most of the time, so some imperfection to improve performance is entirely acceptable.

Therefore, for a first formulation, the result of dialog categorization at a point in time can be enumerated as a set of pairs Result=$\{(C_1, p_1), (C_2, p_2), \ldots, (C_n, P_n)\}$ with the important proviso that $\{C_1, C_2, \ldots, C_n\}$ be an antichain of categories and where, for each i, $p_i$ is the best identified text evidence for $C_i$. For notational purposes, let Result$_{CatSet}$=$\{C|(C, p) \in \text{Result}\}$ and let Result$_{TextSet}$=$\{p|(C, p) \in \text{Result}\}$.

Because we want to base our analysis on a piece of text that supports a set of categories in a dialog categorization decision, it can be better for our purpose to reorganize the output Result equivalently as Result'=$\{(p, S)\}|p \in \text{Result}_{TextSet}, S=\{C|(C, p) \in \text{Result}\}\}$.

The fact that in the above equation S is a nonempty set (actually an antichain) of categories reflects the possibility that a single piece p of text may be the best identified evidence for more than one category. Because of their equivalence, sets of either form—Result or Result'—can be taken as the output of the dialog categorizer.

Hence, in the general case, when we want to undertake a new categorization analysis for a dialog, we would take the previous analysis and consider each element of Result' separately in light of the latest user input, combining the results in the appropriate format at the end.

The Single-Text Case

So, we have reduced the problem of dialog categorization to the situation in which the past analysis of the dialog is represented by a single antichain of categories PrevCat paired with a single piece prev of text, where prev was extracted from the earlier dialog and was judged as being the best evidence for the assignment of each element of PrevCat to the dialog. To fully integrate what we are doing with the notation introduced earlier, (prev, PrevCat)$\in$Result', where Result' is the result of the preceding dialog categorization decision.

We will assume that we have available the set of answers recently found by the interactive response system, which, given the shortness of span of human memory, probably should mean only those answers found in the last round of the dialog. This is not necessarily the same as the set of answers actually shown to the user. For instance, it would be reasonable if, whenever an answer is tagged as repetitive, it should be logged as found, but not shown to the user at that point in time.

Speaking of "a category set obtained using the primary text categorization tool" is a bit wordy, so we will instead use the phrase primary category set for this concept.

Here, we will give three increasingly broad sets of categories that will be considered as possibilities in categorizing a dialog. At a high-level, we can describe the possibilities as follows:

1. A primary category set that shows well-supported or well-defined movement as compared with the previous stage of the dialog is rated best.
2. If the first set is empty, second in preference is a primary category set that leads to at least one non-repetitive constrained answer.

3. If the second set does not lead to a good response, then we turn to incorporating categorization based on examining unconstrained answers.

From the user's dialog input, we may extract two items relevant to the next dialog categorization decision. One is curr, the current or latest input. The other PickedCat, a category explicitly chosen by the user to better specify his current interest. As a default, when the user makes no choice, we take PickedCat to be T. (This is the main reason for introducing T into the formalism.)

After receiving each dialog input from a user, prev and curr are combined by concatenation to form the concatenated input concat.

What we want to do is to use PrevCat, PickedCat, prev, and curr to determine a set PartialResult(prev, PrevCat, curr, PickedCat) = $\{(C_1, p_1), (C_2, p_2), \ldots, (C_m, p_m)\}$ such that 1. the finite set CurrCat=$\{C_1, C_2, \ldots, C_m\}$ is an antichain of categories that are candidates for assignment to the dialog in light of the current user input, and 2. for each i, the best identified textual evidence for each category $C_i$, is $p_i$, which we expect to be, and consequently will limit to be, one of either concat or curr.

The ordering of the two conditions reflects the fact that CurrCat will be specified first, and then textual evidence will fall out in the wash. The last limitation is quite reasonable since the most recent input from the user should be taken to be his most important and most relevant, unless the user is trying to deliberately mislead the system, in which case, we should let him have his way.

When we use concat as the best textual evidence, we will say we are keeping the history. When we use curr as the best textual evidence, we will say we are discarding the history.

We have a primary text categorization tool that can be applied to Concat and curr to give sets of categories R(concat) and R(curr). Each set of categories R(concat), and R(curr) is assumed to have only most specific categories. The "R" is meant to suggest "rule-based", but this is only a suggestion.

Whenever our system seems to be failing to make progress, we can try to obtain unconstrained answers by passing concat and curr with no constrained category assignment to the search system, which can then search for matches among all answers in the database. The collected answers which will be found to belong to category sets L(concat) and L(curr), respectively. The "L" here is suggestive of the Lightweight Document Matcher (LDM), which is used in our current implementation, but any sufficiently flexible search system may be used. As we have said before, one way to look at this is as using the search system as an "auxiliary categorizer" to be used when we would not otherwise be able find new categories for the dialog. In our current implementation, L(concat) and L(curr) are necessarily antichains because answers can only belong to minimal, i.e., terminal, categories. In general, we would use only answers in "most specific categories".

Hence, categorization will involve use of the functions R and L. First we will try to use R (the primary text categorization tool), and we will only use L (categorization by document matching) when no, useful categorization is found using R.

Notation: for finite antichains X and Y in poset, let X+Y be the set of minimal (i.e., most specific, in our setting) elements of the union of X and Y. Let $\uparrow X = \{Y | X \leq Y\}$ and let $\downarrow X = \{Y | Y \leq X\}$.

Let S be either one of the categorizers R or L. Let Found(S)=(S(concat)+S(curr))∩↓PickedCat.

Thus, Found(S) is the set of all categories that might be usefully assigned to the dialog at the present time using S. Note the clean way that the user's choice of a limiting category PickedCat enters into the equation. If no category was picked, so that PickedCat=T, the last term in the preceding equational definition is superfluous.

The following analysis is useful for a general understanding of how concepts relate to one another during the categorization of a dialog, but only the primary case of S=R enters into the specification of how actual categorization should behave. Each element of Found(S) can be placed into one of four disjoint sets NotNew(S), Drill(S), SupTS(S), and UnSupTS(S), defined as follows:

1. Let

NotNew(S)=Found(S)∩↑PrevCat, where $$\uparrow PrevCat = \{X \mid (\exists Y \in PrevCat) \, (Y \leq X) \bigcup_{Y \in PrevCat} \uparrow Y.$$

These are the elements of Found(s) that are definitely not new categories because they are in-the set of previously found categories or are less specific that previously found categories.

2. Let W(S)=Found(S)−NotNew(S). Then

Drill(s)=W(S)∩↓PrevCat, where $$\downarrow PrevCat = \{X \mid (\exists Y \in PrevCat) \, (X \leq Y) \bigcup_{Y \in PrevCat} \downarrow Y.$$

These are new drill-down categories that are definitely more specific than previously found categories. When S=R and the primary text categorization tool is rule-based, these then can be called rule-based drill-down categories for emphasis.

3. Let U(S)=Found(S)−[NotNew(S)∪Drill(s)]. Then

SupTS (s)=U(S)∩S(curr)

This is the set of currently supported topic switches, which we shorten usually to supported topic switches. Every element here is a new topic based on the current input, and it includes all new topics based on the concatenated input that are, supported by the current input. It works out this way because Found(S) is the set of most specific elements of the union of S(concat) and S(curr). When S=R and the primary text categorization tool is rule-based, these can be called rule-based supported topic switches for emphasis.

4. Let

UnSupTS(S)=Found(S)−[NotNew(S)∪Drill(S)∪SupTS (S)].

This is the set of categories from the concatenated input that are topic switches but they are not supported by categories assigned to the current input alone. These categories are called unsupported topic switches.

The mathematical expressions defining the disjoint sets NotNew(S), Drill(S), SupTS(S), and UnSupTS(S), are not unique. Other equivalent definitions are readily obtainable. The definitions given were chosen to suggest a simple way to compute these sets in practice.

We need to find not only categories, but also the best textual evidence for each category. This is easy to do using the following criterion that tells us whether to discard or to keep the history:

Shortness Criterion: Whenever we assign a category to a dialog, we will be able to determine a shortest text that supports that judgment, i.e., curr if the category is in S(curr), and concat otherwise.

If there are specific answers in the database that belong to a category C assigned to a dialog—we assume that which categories have specific answers is known beforehand—then the evidence p judged best for that category is to be passed to the search system along with the category C, in order to restrict the search space, in order to find possible constrained answers in that category.

Our pragmatic approach is that, in an interactive response system, repetitive answers are not to be redisplayed, while non-repetitive answers are to be displayed (at least, if there are not too many of them). From the point of view of dialog categorization, the occurrence of repetitive answers indicates we are at, or are nearing, a dead end, so that perhaps some other method of categorization should be invoked. Thus, to determine whether or not we should invoke the search system to do categorization via unconstrained answers, we need to determine whether or not a constrained answer is repetitive in the context of the present dialog.

Our technical definition of a repetitive answer is one that appeared in the list of answers found recently. In our current implementation, we use a minimal definition of recently, wherein it means after the user's immediately preceding input. While other reasonable definitions may be substituted, the technical definition of "recently" should always include "after the user's immediately preceding input". The definition of repetitive answer given above is general, so it applies to unconstrained answers as well as constrained answers. Thus, a non-repetitive answer may either be entirely new, or it may have been presented to the user earlier in the dialog, but it cannot have been found when the query immediately preceding the current query was processed. Note that there is a distinction between being found in the immediate past and being presented to the user in the immediate past, although any answer presented in the immediate past was certainly found in the immediate past. Also, if a answer is determined to be repetitive, it should have been displayed at some point in the past. However, an answer could have been displayed earlier without being marked as being repetitive now because it might not have been found in the recent past. We will need to always keep track of all answers found, repetitive or not.

We wish to create a regime for category assignment by enumerating a sequence of three antichains of categories:

$S_1, S_2, S_3$ that can be assigned to a dialog in response to a current query. The first two of these sets will be seen to be sets of primary categories. While it will be true $S_1 \subseteq S_2$, it will not necessarily be true that $S_2 \subseteq S_3$, but it will be true that $\uparrow S_1 \subseteq \uparrow S_2 \subseteq \uparrow S_3$, which is really what you want of an increasingly broad set of categories for a dialog. In order-theoretic terms, we have a chain of three sets related by the Smyth preorder, which is widely used in theoretical studies of non-determinism. In the Smyth preorder, $S_1$ is largest, $S_2$ is intermediate, and $S_3$ is smallest. The Smyth preorder is one way to extend a partial order on a set to a kind of order on the power set of that set.

The crux of the idea is to let the antichain

CurrCat=$\{C_1, C_2, \ldots, C_m\}$ of categories that are components of elements of PartialResult(prev, PrevCat, curr, PickedCat)

be the first of the three category sets that reflects the existence, in order, of 1. a primary category that is a drill-down category or a currently supported topic switch,
2. a constrained non-repetitive answer, or
3. a category assignment incorporating unconstrained search.

To elaborate, then, the best categories to assign to a dialog are those in the set $S_1$=Drill(R)∪SupTS(R).

If $S_1$ is nonempty, use it as CurrCat. The second best category set, to be considered only when $S_1$ is empty, is $S_2$=Found(R).

Note that $S_2$=NotNew(R)∪UnSupTS(R) when $S_1$ is empty. If $S_1$ is empty, and at least one non-repetitive constrained answer can be found from $S_2$, then let CurrCat= $S_2$. (Just to be completely detailed about it, trying to find an answer from $S_2$ involves (1) sending to the search system either (1A) curr paired with a category C to curr or (1B) concat paired with the category C to concat, depending whether C∈R(curr) or C∈R(concat), and then (2) comparing any answers just found to the list of answers recently found.) The final possibility for CurrCat, to be used when $S_2$ is empty or no non-repetitive constrained answers can be found from $S_2$, is $S_3$=Found(R)+Found(L).

In this last case, the only non-repetitive answers found will be unconstrained, although both constrained and unconstrained repetitive answers may also be found.

Note that for each category $C_i$∈CurrCat, we can determine the minimal evidence for $C_i$, which will be either concat or curr, by using the Shortness Criterion given earlier for identifying the best textual evidence. This now completely defines PartialResult(prev, PrevCat, curr, PickedCat).

The General Case

Having found the sets

PartialResult(prev, PrevCat, curr, PickedCat)

for each pair prev, PrevCat)∈Result', where Result' is the result of the preceding dialog categorization decision, we obtain the dialog categorization result for the current state of the dialog as follows:

1. take the union of those sets,
2. discard from the union those pairs whose categories are not as specific the categories in other pairs in the union, and
3. discard from the union those pairs having the same category as another pair, but whose identified textual evidence, is not minimal.

A Particular, Practical Implementation

We have implemented, and have extensive experience with, an interactive automated response system in which dialog categorization differs in detail from the approach described so far. We now describe how further to improve the approach to dialog categorization in the interests of improved efficiency.

There are two aspects of the general specification of dialog categorization laid out in previous sections that cause a big efficiency hit. The specification was laid out so that modifications to these aspects could be easily described. The troublesome aspects are these:

1. The set Result' may have more than one element, and the specification above requires iterating over all the elements of that set.
2. The Shortness Criterion for best textual evidence can require more than one call to the search system as part of sorting out what is the best evidence for a single category.

In the current implementation, we have made reasonable modification that permits us to avoid these troublesome aspects. Basically, we replaced the Shortness Criterion by the Heuristic Criterion, given below. The Heuristic Criterion tries to conform to the Shortness Criterion, but not at the expense of increasing the cardinality of Result'. Hence, the Heuristic Criterion is tightly bound to the specification of PartialResult(prev, PrevCat, curr, PickedCat).
Heuristic Criterion: For all categories in
PartialResult(prev, PrevCat, curr, PickedCat), we deem the best evidence to be given as follows:

1. If Drill(R)≠∅, then keep the history.
2. If Drill(R)=∅ and SupTS(R)≠∅, then discard the history.
3. Otherwise, keep the history.

As justification for the Heuristic Criterion, note that in the case using primary categories in dialogue categorization, only a currently supported topic switch definitely calls for discarding the history by the Shortness Criterion. In the other cases of using primary categories, keeping the history makes the most intuitive sense in the absence of deeper analysis.

Further justification in the case of using search-based categorization comes from how the search system in our implemented system works. Because the search system in our current implementation presently works strictly by matching keywords, and because all the text in curr is also in concat, we know that $L(curr) \subseteq \uparrow L(concat)$. Hence, in this setting Found(L)=L(concat), so we only have to send concat to the search system for an unconstrained search in order to compute Found(L). Hence, when we keep the history in this case, we are using evidence that is sufficient for the categorization decision, although it may or may not be minimal. At any rate, one should keep in mind that the Shortness Criterion, while brief and elegant, is not logically necessary, so we should not feel too bad about abandoning it when we have good reason to do so and when overall effectiveness of an interactive automated response system is likely to be enhanced.

Note that both of the troubling aspects of dialog categorization go away when we switch from using the Shortness Criterion to using the Heuristic Criterion for determining the best evidence. In fact, the whole specification of dialog categorization for our current implementation is reduced because there is never more than one piece of textual evidence identified for a set of categories. However, it is instructive to see how what we are doing in actuality compares with and is no more than a slight deviation from a system built in strict conformance to the general, somewhat abstract specification given in the previous sections.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A computerized interactive automated response system which responds to a query from a user in the context of a dialog with the user comprising:

a text categorizer that assigns categories to text extracted from a dialog with the user;

a search system which matches text extracted from a dialog with answers; and a dialog manager which maintains a user's session history, decides what text should be sent to the text-categorizer and to the search system, makes use of a partially ordered category scheme to categorize each stage of the dialog based on results returned by the text categorizer and the search system, and uses results of dialog categorization to create suitable responses to the user's query in the context of his or her earlier queries.

2. The computerized interactive automated response system recited in claim 1, wherein the dialog manager comprises:

a user interface manager which receives inputs from a user and outputs prompts for more information or answers to the user;

a session manager which receives the user inputs from the user interface manager and maintains a session history; and a text analyzer which receives user inputs in the form of text from the session manager, parses the text and directs the parsed text to the text categorizer and the search engine, the text analyzer receiving results from the text categorizer and the search engine and passing those results to user interface manger via the session manager.

3. The computerized interactive automated response system recited in claim 2, wherein the dialog manager receives natural language queries from a user and determines relevant text from the queries to send to the text categorizer and the search system.

4. The computerized interactive automated response system recited in claim 2, wherein the text categorizer is a rules based system.

5. The computerized interactive automated response system recited in claim 2, wherein the search system includes a lightweight document matcher.

6. The computerized interactive automated response system recited in claim 1, wherein the dialog manager, using results returned by the text categorizer and the search system, preferentially determines new drill-down categories that are more specific to previously found categories in a dialog with the user to create a suitable response to the user's current query in the context of his or her earlier queries.

7. The computerized interactive automated response system recited in claim 6, wherein the dialog manager sends constrained queries to the search system, a constrained query being associated with an assigned category.

8. The computerized interactive automated response system recited in claim 6, wherein the dialog manager, uses results returned by the text categorizer and the search system, determines a topic switch from previously found categories in a dialog with the user and, based on the determination of a topic switch, creates a suitable response to the user's current query.

9. The computerized interactive automated response system recited in claim 8, wherein the dialog manager keeps the session history when new drill-down categories are determined but discards the session history when a topic switch is determined.

10. The computerized interactive automated response system recited in claim 9, wherein the dialog manager comprises:

a user interface manager which receives inputs from a user and outputs prompts for more information or answers to the user;

a session manager which receives the user inputs from the user interface manager and maintains a session history; and a text analyzer which receives user inputs in the form of text from the session manager, parses the text and directs the parsed text to the text categorizer and the search engine, the text analyzer receiving results from the text categorizer and the search engine and passing those results to user interface manger via the session-manager.

11. The computerized interactive automated response system recited in claim 10, wherein the text categorizer is a rules based system.

12. The computerized interactive automated response system recited in claim 10, wherein the search system includes a lightweight document matcher.

13. The computerized interactive automated response system recited in claim 10, wherein the text categorizer is a rules based system and the search system includes a lightweight document matcher.

14. A computer implemented interactive automated response method comprising the steps of:

receiving a user input by a dialog manager and, after each user input is received, extracting by the dialog manager one or more texts from a record of dialog with the user, sending those texts to a text categorizer, and then using results of categorizing the texts to assign one or more categories to the dialog with the user;

sending by the dialog manager queries in the form of texts that are deemed to be the best evidence for category assignments so far made to a search system;

for each query sent to the search system by the dialog manager, returning by the search system any matches together with categories to which each matching answer belongs, as well as, for each match, a score indicating the relative degree of fit of the match to the query; and based on the categories assigned and the answers found, generating a response by the dialog manager to the user.

15. The computer implemented interactive automated response method recited in claim 14, further comprising the step of using by the dialog manager the categories found by the text categorizer to narrow provisionally a set of possible answers deemed relevant to the user's latest query.

16. The computer implemented interactive automated response method recited in claim 14, further comprising the step of determining by the dialog manager what text is to be sent to the search system by comparing currently assigned categories with categories previously assigned to detect whether the user is asking about a more specific subject or switching topics.

17. The computer implemented interactive automated response method recited in claim 16, wherein if the user is asking about a more specific subject, then searching for an answer in context based on a combination of a current query with an earlier query or queries.

18. The computer implemented interactive automated response method recited in claim 16, wherein if the user is switching topics, then using a current query, in isolation from earlier queries, as a basis for a search for answers.

19. The computer implemented interactive automated response method recited in claim 16, further comprising the steps of:

preferentially determining new drill-down categories that are more specific to previously found categories in a dialog with the user;

searching for an answer in context based on a combination of a current query with an earlier query or queries; but determining a topic switch from previously found categories in a dialog with the user; and, if the user is switching topics, searching for answers using a current query, in isolation from earlier queries.

* * * * *